(12) United States Patent
Lundell et al.

(10) Patent No.: US 7,769,407 B2
(45) Date of Patent: Aug. 3, 2010

(54) SYSTEM, APPARATUS, COMPUTER PROGRAM PRODUCT AND METHOD FOR CONTROLLING TERMINAL OUTPUT POWER

(75) Inventors: Antero Lundell, Turku (FI); Tommi Kangassuo, Halikko (FI)

(73) Assignee: Nokia Corporation, Espoo (FI)

( * ) Notice: Subject to any disclaimer, the term of this patent is extended or adjusted under 35 U.S.C. 154(b) by 1222 days.

(21) Appl. No.: 10/836,128

(22) Filed: Apr. 30, 2004

(65) Prior Publication Data

US 2005/0255872 A1    Nov. 17, 2005

(51) Int. Cl.
*H04B 7/00* (2006.01)
*H04B 7/185* (2006.01)
*H04W 72/00* (2009.01)

(52) U.S. Cl. .................. 455/522; 455/450; 370/318

(58) Field of Classification Search .............. 370/318, 370/334, 338; 455/69, 522, 54.1, 33.1, 13.4, 455/434, 446, 560
See application file for complete search history.

(56) References Cited

U.S. PATENT DOCUMENTS

| | | | |
|---|---|---|---|
| 5,220,678 A * | 6/1993 | Feei | 455/69 |
| 5,634,195 A * | 5/1997 | Sawyer | 455/522 |
| 5,995,496 A * | 11/1999 | Honkasalo et al. | 370/318 |
| 6,477,388 B1 | 11/2002 | Schmutz | |
| 6,512,784 B2 | 1/2003 | Schilling | |
| 6,647,005 B1 | 11/2003 | Cao et al. | |
| 7,050,824 B2 | 5/2006 | Masseroni et al. | |
| 7,069,035 B2 | 6/2006 | Chen et al. | |
| 7,142,548 B2 | 11/2006 | Fong et al. | |
| 7,167,713 B2 | 1/2007 | Anderson | |
| 7,215,958 B2 | 5/2007 | Kovacs et al. | |
| 7,236,792 B2 * | 6/2007 | Uchida et al. | 455/452.1 |

(Continued)

FOREIGN PATENT DOCUMENTS

EP    0 515 335 A2 *    5/1992

(Continued)

OTHER PUBLICATIONS $3^{rd}$ Generation Partnership Project, "Radio Access Network; Dual Transfer Mode; Stage 2", 3GPP TS 43.055 V6.4.0, Feb. 2004.

(Continued)

*Primary Examiner*—Charles N Appiah
*Assistant Examiner*—Kiet Doan
(74) *Attorney, Agent, or Firm*—Hollingsworth & Funk, LLC

(57) ABSTRACT

A system, apparatus, computer program product, and method for controlling output power levels of over-the-air (OTA) transmission signals from a terminal operable on a network. At least one parameter used by the terminal in establishing its proper RF output power level is provided by the network in a channel assignment message(s). The terminal can then define the proper output power level in changing circumstances, such as where the common broadcast channel is mapped on a different band than traffic channels, in connection with handover or DTM operations, etc. Further, the parameter is provided via the channel assignment message(s) in connection with DTM operation after handover, where the common broadcast channel is mapped on the same frequency band as the traffic channel. When the proper output power level has been defined using the parameter received from the channel assignment message, the terminal can communicate information to the network using the proper output power level.

43 Claims, 8 Drawing Sheets

U.S. PATENT DOCUMENTS

| | | | |
|---|---|---|---|
| 7,286,499 | B2 | 10/2007 | Tiedemann, Jr. |
| 7,532,601 | B2 | 5/2009 | Kayama et al. |
| 2001/0017848 | A1* | 8/2001 | Tiedemann, Jr. ............ 370/318 |
| 2003/0078037 | A1* | 4/2003 | Auckland et al. ........... 455/422 |
| 2003/0123425 | A1 | 7/2003 | Walton et al. |
| 2004/0077348 | A1 | 4/2004 | Sebire et al. |
| 2004/0105406 | A1* | 6/2004 | Kayama et al. ............. 370/322 |
| 2005/0003831 | A1* | 1/2005 | Anderson ................ 455/456.1 |
| 2005/0255872 | A1 | 11/2005 | Lundell et al. |

FOREIGN PATENT DOCUMENTS

| | | |
|---|---|---|
| EP | 1 211 817 A1 * | 12/2000 |
| EP | 1 211 817 A1 | 5/2002 |
| WO | WO0163851 | 8/2001 |

OTHER PUBLICATIONS

3$^{rd}$ Generation Partnership Project, "Mobile Radio Interface Layer 3 Specification; Radio Resource Control (RRC) Protocol", 3GPP TS 44.018 V6.6.0, Feb. 2004.

3$^{rd}$ Generation Partnership Project, "General Packet Radio Service (GPRS); Mobile Station (MS)- Base Station System (BSS) Interface; Radio Link Control/Medium Access Control (RLC/MAC Protocol)", 3GPP TS 44.060 V6.6.0, Feb. 2004.

3$^{rd}$ Generation Partnership Project, "Radio Access Network; Radio Subsystem Link Control", 3GPP TS 45.008 V6.4.0, Feb. 2004.

European Telecommunication Standard, "Digital Cellular Telecommunications System (Phase 2+); Radio Subsystem Link Control", GSM 05.08 version 5.7.0, May 1998.

U.S. Office Action dated Jul. 31, 2007 for U.S. Appl. No. 10/946,905, 19 pages.

U.S. Office Action dated Apr. 11, 2008 for U.S. Appl. No. 10/946,905, 22 pages.

U.S. Office Action dated Aug. 11, 2008 for U.S. Appl. No. 10/946,905, 10 pages.

U.S. Office Action dated Apr. 1, 2009 for U.S. Appl. No. 10/946,905, 12 pages.

3$^{rd}$ Generation Partnership Project, "General Packet Radio Service (GPRS); Service description; Stage 2", 3GPP TS 23.060 V6.4.0, Release 6, Mar. 2004.

3$^{rd}$ Generation Partnership Project, "Mobile Station (MS)—Base Station System (BSS) interface; Radio Link Control/Medium Access Control (RLC/MAC) protocol", 3GPP TS 44.060 V6.6.0, Release 6, Feb. 2004.

3$^{rd}$ Generation Partnership Project, TS 43.055 v6.4.0, Technical Specification Group GSM/Edge, Radio Access Network; Dual Transfer Mode; Stage 2 (Release 6) p. 1-23, 2004.

Pecen et al., "Simultaneous Voice and Data Operation for GPRS/Edge: Class A Dual Transfer Mode", IEEE Personal Communications, Apr. 2001, pp. 14-29.

* cited by examiner

GSM 400, GSM 900, GSM 850, GSM 700

| POWER CONTROL LEVEL 202A | NOMINAL OUTPUT POWER (dBm) 200A | TOLERANCE (dB) FOR CONDITIONS | |
|---|---|---|---|
| | | NORMAL | EXTREME |
| 0-2 | 39 | ±2 | ±2.5 |
| 3 | 37 | ±3 | ±4 |
| 4 | 35 | ±3 | ±4 |
| 5 | 33 | ±3 | ±4 |
| 6 | 31 | ±3 | ±4 |
| 7 | 29 | ±3 | ±4 |
| 8 | 27 | ±3 | ±4 |
| 9 | 25 | ±3 | ±4 |
| 10 | 23 | ±3 | ±4 |
| 11 | 21 | ±3 | ±4 |
| 12 | 19 | ±3 | ±4 |
| 13 | 17 | ±3 | ±4 |
| 14 | 15 | ±3 | ±4 |
| 15 | 13 | ±3 | ±4 |
| 16 | 11 | ±5 | ±6 |
| 17 | 9 | ±5 | ±6 |
| 18 | 7 | ±5 | ±6 |
| 19-31 | 5 | ±5 | ±6 |

FIG. 2A

DCS 1800

| POWER CONTROL LEVEL 202B | NOMINAL OUTPUT POWER (dBm) 200B | TOLERANCE (dB) FOR CONDITIONS | |
|---|---|---|---|
| | | NORMAL | EXTREME |
| 29 | 36 | ±2 | ±2.5 |
| 30 | 34 | ±3 | ±4 |
| 31 | 32 | ±3 | ±4 |
| 0 | 30 | ±3 | ±4 |
| 1 | 28 | ±3 | ±4 |
| 2 | 26 | ±3 | ±4 |
| 3 | 24 | ±3 | ±4 |
| 4 | 22 | ±3 | ±4 |
| 5 | 20 | ±3 | ±4 |
| 6 | 18 | ±3 | ±4 |
| 7 | 16 | ±3 | ±4 |
| 8 | 14 | ±3 | ±4 |
| 9 | 12 | ±4 | ±5 |
| 10 | 10 | ±4 | ±5 |
| 11 | 8 | ±4 | ±5 |
| 12 | 6 | ±4 | ±5 |
| 13 | 4 | ±4 | ±5 |
| 14 | 2 | ±5 | ±6 |
| 15-28 | 0 | ±5 | ±6 |

FIG. 2B

```
< IA Rest Octets > : :=
    ...
< EGPRS Packet Uplink Assignment > : :=
< Extended RA : bit (5) >
{ 0 | 1 < Access Technologies Request : Access Technologies Request struct > }
{ 1
    ...
    { null | L
    | H
        { 0 | 1 < TBF_MS_TXPWR_MAX: bit (5) > }    ← 508
    }
    | 0                           -- Multi Block Allocation
    ...
    { null | L
    | H
        { 0 | 1 < PFI : bit (7) > }
        { 0 | 1 < TBF_MS_TXPWR_MAX: bit (5) > }    ← 510
    }
};
    ...
< Packet Uplink Assignment > : :=
    ...
{ null | L
| H
    { 0 | 1 < PFI : bit (7) > }
    { 0 | 1 < TBF_MS_TXPWR_MAX: bit (5) > }    ← 512
};
< Packet Downlink Assignment > : :=
    ...
{ null | L
| H
    { 0 | 1 < PFI : bit (7) > }
    { 0 | 1 < TBF_MS_TXPWR_MAX: bit (5) > }    ← 514
};
```

*FIG. 5*

```
< Packet Downlink Assignment message content > : :=
    . . .
    { null | 0 bit** = < no string >
    | 1
    { 0 | 1 < PFI : bit (7) > }
    { 0 | 1 < TBF_MS_TXPWR_MAX: bit (5) > }   ← 802
    . . .
```
800 {

FIG. 8

```
< Packet Uplink Assignment message content > : :=
    < PAGE_MODE : bit (2) >
    { 0 | 1 <PERSISTENCE_LEVEL : bit (4) > * 4 }
    { { 0 < Global TFI : < Global TFI IE > >
        . . .
        { 0 -- Message escape
            < Packet Timing Advance : < Packet Timing Advance IE > >
            . . .
            < Single Block Allocation : < Single Block Allocation struct > >
                . . .
                { 0 | 1 <Packet Extended Timing Advance : bit (2) > }
                . . .
                { null | 0 bit** = < no string >
                | 1
                { 0 | 1 < PFI : bit (7) > }
                { 0 | 1 < TBF_MS_TXPWR_MAX: bit (5) > }   ← 904
            { | 1 -- Message escape bit used to define EGPRS message contents
            . . .
            < Packet Timing Advance : < Packet Timing Advance IE > >
            . . .
            < Multi Block Allocation : < Multi Block Allocation struct > >
                . . .
                { null | 0 bit** = < no string >
                | 1
                { 0 | 1 < PFI : bit (7) > }
                { 0 | 1 < TBF_MS_TXPWR_MAX: bit (5) > }   ← 908
                . . .
```

SYSTEM, APPARATUS, COMPUTER PROGRAM PRODUCT AND METHOD FOR CONTROLLING TERMINAL OUTPUT POWER

FIELD OF THE INVENTION

This invention relates in general to wireless communications, and more particularly to a system, apparatus, computer program product, and method for controlling terminal output power levels.

BACKGROUND OF THE INVENTION

In wireless network environments such as cellular networks, network entities are provided to facilitate the communication between communicating devices on the network. In Global System for Mobile communications (GSM) networks, Base Station Systems (BSS) are provided on the network, which include one or more Base Transceiver Stations (BTS) and a Base Station Controller (BSC). The BTS manages the radio interface to Mobile Stations (MS) and/or other terminals, and includes the transceivers and antennas to service each cell. A group of BTSs are controlled by a BSC, which provides the control functions and physical links between the Mobile Switching Center (MSC) and the BTS. The BSC performs high-capacity switching functions, including handover and control of radio frequency (RF) power levels in BTSs.

If there is no active connection between a terminal and a BSS, the terminal is at rest or in "idle" mode, and the BSS has no specific tasks to perform relative to the terminal. However, the terminal continues to monitor control channels such as the Broadcast Control Channel (BCCH) or the Packet Broadcast Control Channel (PBCCH) of the current and neighboring cells, to facilitate location update operations.

During a connection, i.e. when the terminal is in transfer mode, power control functions serve to maintain and optimize the radio channel. It is very important that terminals that send data to the network use the proper output power level. If the output power level of the terminal is too low, data throughput may suffer due to errors caused by sub-optimal radio conditions. If the output power level of the terminal is too high, excessive power consumption results, and the data transmission may cause interference to other channels used by other terminals.

In General Packet Radio Service (GPRS) data transmissions, the terminal determines the appropriate output power levels using specified formulas. These formulas include parameters that the terminal obtains from various sources, namely from system information messages broadcast by the network, or from control messages that are sent specifically to each of the terminals. Such system information messages are transmitted by the network in two possible logical channel structures, depending on the base selected by the network operator. If packet channel structure exists, the system information messages are transmitted on the PBCCH; otherwise the system information messages are transmitted on the BCCH.

As described above, the terminal may operate in different modes, such as idle and transfer modes. The terminal is able to use different frequency bands in these different modes. For example, when in idle mode, the terminal may listen for system information messages in the 900 MHz band. The terminal may therefore receive terminal output power level indications via system information messages from the BCCH channel in, for example, the 900 MHz band. When in transfer mode, the network may allocate the traffic channel in a different band, such as the 1800 MHz band. However, the terminal output power level indications provided via this different frequency band (e.g., 1800 MHz band) may be different or unavailable than that provided via the control channel in the other band (e.g., 900 MHz band). This may be problematic, as the terminal has received conflicting parameters or other information for use in determining the proper terminal output power level to be used by the terminal. Thus, in current practice, the terminal has difficulties in determining the correct output power level to be used when the Traffic Channel (TCH) is mapped on a different band than the common channels such as BCCH/PBCCH, and vice-versa. Due to this discrepancy, poor connection quality, errors in transmission, interference or other undesirable radio connection characteristics may result.

Further, the terminal output power level to be used by the terminal may depend on the particular cell/BSS in which the terminal is operating. Therefore, when handover occurs, the output power of the terminal may not be set correctly. Further, new modes such as the Dual Transfer Mode (DTM) allows the terminal to operate simultaneously in packet-switched (PS) and circuit-switched (CS) modes. When operating in these different modes, and when handover occurs, the output power of the terminal may not be set correctly. This problem cannot reasonably be solved using the system information messages, since it requires a significant amount of space in already heavily loaded messages. Furthermore, defining the parameter for various different frequency bands in the system information messages is not flexible, as new frequency bands may be defined in the future.

Accordingly, there is a need in the communications industry for a manner of properly establishing the terminal output power levels in changing circumstances. These changing circumstances include, but are not limited to, situations where the common broadcast channel is mapped on a different band than traffic channels, handover, DTM implementations and the like. A further need exists for a system and methodology that provides an unintrusive and efficient manner for providing such information, while working within existing protocols and structures. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus, computer program product, and method for controlling terminal output power levels.

In accordance with one embodiment of the invention, a method is provided for controlling the output power level of over-the-air (OTA) transmission signals from a terminal operable on a network. At least one channel assignment message is generated to facilitate identification of at least one channel for the terminal to communicate information. A maximum terminal output power level value is associated with the at least one channel assignment message, which is transmitted from the network to the terminal. The terminal defines a terminal output power level to be used as the terminal's output power level using the maximum terminal output power level value received via the at least one channel assignment message.

According to particular embodiments of such a method, the maximum terminal output power level value may include information to facilitate the definition of the terminal output power level to be used as the terminal's output power level. For example, the information provided via the assignment message may include an index to a data structure (e.g., table) to identify a maximum power level corresponding to the index, where defining the terminal output power level then involves defining the terminal output power level using this maximum power level obtained from the data structure using the index. In another embodiment, the maximum terminal output power level value may include a representation (e.g., bits) of a maximum power level available for use by the terminal. In such case, defining the terminal output power level includes defining the terminal output power level directly using this representation of the maximum power level.

According to more particular embodiments, the method further includes communicating the information from the terminal on the channel(s) at the output power level corresponding to the defined terminal output power level. In another embodiment, the method includes receiving a second maximum terminal output power level value at the terminal via a control channel, and defining the terminal output power level using the second maximum terminal output power level value received via the control channel. The control channel may be, for example, a Broadcast Control Channel (BCCH), Packet Broadcast Control Channel (PBCCH), or other control channel associated with the terminal. In one embodiment, the second maximum terminal output power level value comprises a broadcast maximum terminal output power level value, such that defining the terminal output power level involved defining the terminal output power level using the broadcast maximum terminal output power level value.

According to other particular embodiments of such a method, associating the maximum terminal output power level value with the at least one channel assignment message involves including a binary representation of the maximum terminal output power level value into a code segment of the at least one channel assignment message. In one embodiment the inclusion of the binary representation involves including a binary representation of the maximum terminal output power level value into an information element of the at least one channel assignment message. In another particular embodiment, including the binary representation involves defining a binary, five-bit TBF_MS_TXPWR_MAX field representative of an index to a power level table identifying a maximum terminal output power level that can be used by the terminal in the communication of the information. In yet another embodiment, the method further includes setting a value of PMAX based on the binary representation of the maximum terminal output power level value, where defining a terminal output power level using the maximum terminal output power level value involves calculating the terminal output power level according to the formula $$P_{CH} = \min(\Gamma_0 - \Gamma_{CH} - \alpha*(C+48), PMAX).$$

Further, the binary representation of the maximum terminal output power level value may include an index to a power level data structure. In such case, setting the value of PMAX involves setting the value of PMAX based on a maximum power level identified by the index in the power level data structure.

According to other particular embodiments of such a method, generating the at least one channel assignment message involves generating a DTM assignment command at the network in response to receipt of a DTM request message from the terminal, and associating the maximum terminal output power level value with the at least one channel assignment message involves associating the maximum terminal output power level value with the DTM assignment command. According to another embodiment, the DTM assignment command is initiated at the network, and associating the maximum terminal output power level value with the channel assignment message(s) involves associating the maximum terminal output power level value with the network-initiated DTM assignment command. In another embodiment, generating the at least one channel assignment message includes generating a packet assignment message at the network in response to receipt of a DTM request message from the terminal, and associating the maximum terminal output power level value with the at least one channel assignment message includes associating the maximum terminal output power level value with the packet assignment message. According to another embodiment, the channel assignment message is initiated at the network, and associating the maximum terminal output power level value with the channel assignment message(s) involves associating the maximum terminal output power level value with the network-initiated packet assignment message. Another particular embodiment involves associating the maximum terminal output power level value with the at least one channel assignment message by associating the maximum terminal output power level value with the at least one channel assignment message upon Dual Transfer Mode (DTM) establishment following handover.

According to still further particular embodiments of such a method, generating the at least one channel assignment message includes generating an Immediate Assignment message, and associating the maximum terminal output power level value with the at least one channel assignment message involves associating the maximum terminal output power level value with an Immediate Assignment Rest Octets information element of the Immediate Assignment message. In various embodiments, associating the maximum terminal output power level value with an Immediate Assignment Rest Octets information element involves associating the maximum terminal output power level value with any one or more of an Enhanced GPRS (EGPRS) Packet Uplink Assignment segment of the Immediate Assignment Rest Octets information element, a packet uplink assignment segment of the Immediate Assignment Rest Octets information element, and/or a packet downlink assignment segment of the Immediate Assignment Rest Octets information element.

According to other particular embodiments of such a method, generating the at least one channel assignment message involves generating a Radio Resource (RR) Packet Uplink or Downlink Assignment message having a respective RR Packet Uplink or Downlink Assignment information element, and where associating the maximum terminal output power level value with the at least one channel assignment message involves associating the maximum terminal output power level value with the RR Packet Uplink or Downlink Assignment information element. In another embodiment, the at least one channel assignment message is generated using a Radio Link Control/Medium Access Control (RLC/MAC) message including a Packet Uplink or Downlink Assignment message, where associating the maximum terminal output power level value with the at least one channel assignment message thus involves associating the maximum terminal output power level value with an information element of the respective Packet Uplink or Downlink Assignment message. In yet another embodiment, generating the at least one channel assignment message involves generating a Dual Transfer Mode (DTM) assignment message, and where associating the maximum terminal output power level value with the at least one channel assignment message involves associating the maximum terminal output power level value with the DTM assignment message.

In accordance with another embodiment of the invention, a method is provided for controlling the output power level at a terminal. The method includes receiving a channel assignment message at the terminal from the network. The channel assignment message includes a first maximum terminal output power level indicator. A terminal output power level is defined based on the first maximum terminal output power level indicator received via the channel assignment message. A terminal output power level of the terminal is set to correspond to the defined terminal output power level. Data is transmitted from the terminal at the terminal output power level. In accordance with one particular embodiment, the first maximum terminal output power level indicator comprises a dedicated maximum terminal output power level indicator.

According to a more particular embodiment, the method further includes receiving a system information message at the terminal via a control channel, where the system information message includes a second maximum terminal output power level indicator. In such case, defining the terminal output power level further involves defining the terminal output power level based on the second maximum terminal output power level indicator received via the system information message. The second maximum terminal output power level indicator may be, for example, a broadcast maximum terminal output power level indicator. In yet another embodiment, the output power level of the terminal is established by setting the output power level of the terminal to correspond to the defined terminal output power level based on the second maximum terminal output power level indicator if the network did not provide the first maximum terminal output power level indicator.

In accordance with another embodiment of the invention, a terminal is provided. The terminal is capable of communicating over-the-air (OTA) via a network. The terminal includes a transceiver to receive at least one channel assignment message including a maximum terminal output power level value. The terminal further includes a processor configured to define a terminal output power level to be used as the terminal's output power level based on the maximum terminal output power level value provided via the at least one channel assignment message.

According to a more particular embodiment of such a terminal, the processor is configured by at least an output power calculation module to calculate the terminal output power level according to the formula $$P_{CH} = \min(\Gamma_0 - \Gamma_{CH} - \alpha^*(C+48), PMAX),$$

where PMAX is the maximum allowed output power in the cell, and is set based on a) GPRS_MS_TXPWR_MAX_CCH if a PBCCH exists; or b) MS_TXPWR_MAX_CCH otherwise; unless c) TBF_MS_TXPWR_MAX is provided by the network, which corresponds to the maximum terminal output power level value provided via the channel assignment message, wherein PMAX is set based on TBF_MS_TXPWR_MAX. According to yet another embodiment, the terminal further includes an output power generator coupled to the processor to receive the defined terminal output power level, and coupled to the transceiver to regulate the output power of a transmitted signal from the transceiver to the network.

In accordance with another embodiment of the invention, a computer-readable medium is provided, having instructions stored on the medium that are executable by a computer system for controlling the output power level at a terminal. The computer-executable instructions perform steps including receiving a channel assignment message at the terminal from the network, where the channel assignment message includes a maximum terminal output power level indicator. The computer-executable instructions further perform steps including defining a terminal output power level to be used as the terminal's output power level based on the maximum terminal output power level indicator received via the channel assignment message, setting a terminal output power level of the terminal to correspond to the defined terminal output power level, and transmitting data from the terminal at the terminal output power level.

According to another embodiment of the invention, a system is provided for controlling the output power level of over-the-air (OTA) transmission signals from a terminal operable on a network. The system comprises means for generating at least one channel assignment message to facilitate identification of at least one channel for the terminal to communicate information, means for associating a maximum terminal output power level value with the at least one channel assignment message, and means for transmitting the channel assignment message from the network to the terminal. The system further includes means for defining a terminal output power level using the maximum terminal output power level value received via the channel assignment message.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular representative examples of a system, apparatus, computer program product, and method in accordance with the invention.

BRIEF DESCRIPTION OF THE DRAWINGS

The invention is described in connection with the representative embodiments illustrated in the following diagrams.

FIGS. 2A and 2B are examples of the relationship between nominal output power and corresponding power control levels for different frequency bands;

FIG. 5 illustrates a representative code segment for an Immediate Assignment Rest Octets information element, incorporating a maximum terminal output power level that the terminal shall use;

FIG. 8 illustrates a representative code segment from Packet Downlink Assignment information elements according to one embodiment of the invention;

FIG. 9 illustrates a representative code segment from Packet Uplink Assignment information elements according to one embodiment of the invention.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner for facilitating the control of output power levels of over-the-air (OTA) transmission signals from a terminal operable on a network. At least one parameter used by the terminal in defining its proper RF output power level is provided by the network in a channel assignment message(s). The terminal can then establish the proper output power level in changing circumstances, such as where the common broadcast channel is mapped on a different band than traffic channels, in connection with handover or DTM operations, etc. Further, the parameter is provided via the channel assignment message(s) in connection with DTM operation after handover, where the common broadcast channel is mapped on the same frequency band as the traffic channel. When the proper output power level has been defined using the parameter received from the channel assignment message, the terminal can communicate information to the network using the proper output power level.

Figure 1:
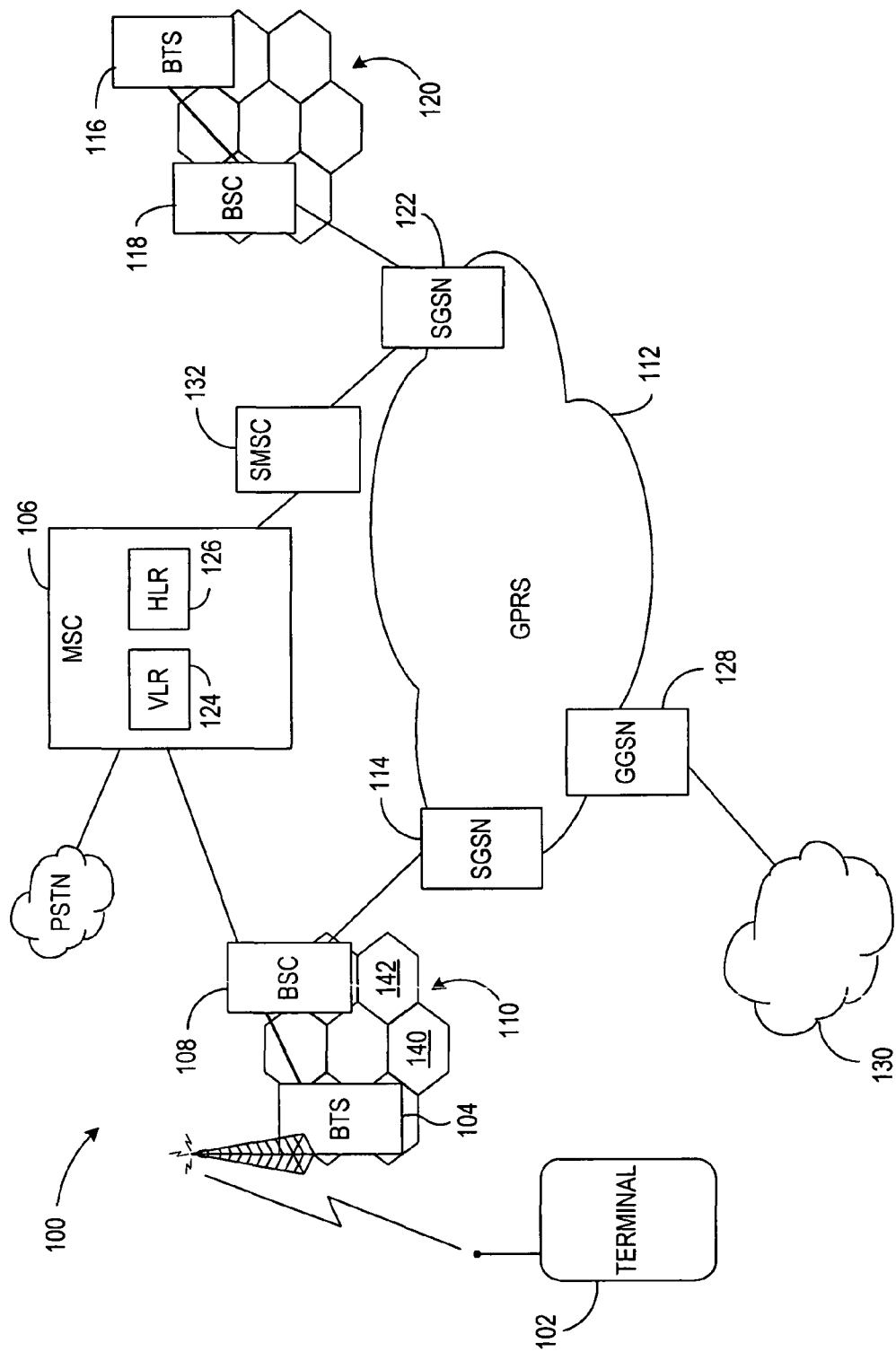
FIG. 1 illustrates a representative GSM/GPRS network environment in which the principles of the present invention may be utilized.

The present invention is applicable in any type of mobile communication systems/networks where the network establishes one or more terminal output power level parameters for use by the terminal. In order to facilitate an understanding of the invention, the present invention is described in terms of GSM/GPRS networks, including GSM/EDGE Radio Access Networks (GERAN). However, those skilled in the art will readily appreciate from the description provided herein that the present invention is equally applicable to analogous networking environments. FIG. 1 illustrates some general aspects of a GSM/GPRS network environment 100 in which the principles of the present invention may be utilized.

Global System for Mobile communications (GSM) is a digital cellular communications system serving as a Public Land Mobile Network (PLMN), where multiple providers may set up mobile networks following the GSM standard. GSM is capable of providing both voice and data services. A GSM (or analogous) network 100 typically includes components such as terminals or Mobile Stations (MS) 102, Base Transceiver Stations (BTS) 104, Mobile Switching Center (MSC) 106, etc. A GSM network may be viewed as a collection of various subsystems, including the Radio Subsystem (RSS) which covers radio aspects, Network and Switching Subsystem (NSS) which manages functions such as call forwarding, handover and switching, and the Operation Subsystem (OSS) that manages the network. Various aspects of the RSS is described in greater detail below.

One or more terminals 102 communicate with the BTS 104 via an air interface. The BTS 104 is a component of a wireless network access infrastructure that terminates the air interface over which subscriber traffic is communicated to and from the terminal 102. The Base Station Controller (BSC) 108 is a switching module that provides, among other things, handover functions, and controls power levels in each BTS 104 of the Base Station System (BSS) 110. The BSC 108 controls the interface between the MSC 106 and BTS 104 in a GSM mobile wireless network, and thus controls one or more BTSs in the call set-up functions, signaling, and in the use of radio channels.

A General Packet Radio System (GPRS) mobile communications network 112 is a packet-switched service for GSM that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. The BTS 104 also controls the interface between the Serving GPRS Support Node (SGSN) 114 and the BTS 104 in a GPRS network 112. Other BTS, BSC, and SGSN components may also be associated with the network system, as depicted by BTS 116 and BSC 118 of BSS 120, and SGSN 122.

The MSC module 106 generally includes or is otherwise associated with the MSC, Visiting Location Register (VLR) 124, and Home Location Register (HLR) 126. The MSC 106 performs a variety of functions, including providing telephony switching services and controlling calls between telephone and data systems, switching voice traffic from the wireless network to the landline network if the call is a mobile-to-landline call, or alternatively switching to another MSC if the call is a mobile-to-mobile call. The MSC 106 also provides the mobility functions for the network, and serves as the hub for multiple BTSs. Generally, it is the MSC 106 that provides mobility management for subscribers, in order to register subscribers, and authenticate and authorize services and access for subscribers. In GSM systems, some of the functionality of the MSC 106 may be distributed to the BSC 108, while in other systems such as TDMA systems, the BSC 108 functions are often integrated with the MSC 106.

Associated with the MSC 106 is the HLR 126 and VLR 124. The HLR 126 is a database that stores information about subscribers in the mobile network, and is maintained by one or more service providers for their respective subscribers. The MSC 106 uses the information stored in the HLR 126 to authenticate and register the subscriber by storing permanent subscriber information including the service profile, the current location of terminals, and activity status of the mobile user. The VLR 124 is a database that may be maintained by the MSC 106 to keep track of all the visiting terminals within a mobile telephony system.

The Serving GPRS Support Nodes (SGSN) 114, 122 serve terminals that support GPRS by sending or receiving packets via a respective BSS 110, 120, and more particularly via the BSC 108, 118 in the context of GSM systems. The SGSN is responsible for the delivery of data packets to and from the terminals within its service area, and performs packet routing and transfer, mobility management, logical link management, authentication, charging functions. etc. In the exemplary GPRS embodiment shown in FIG. 1, the location register of the SGSN 114 stores location information such as the current cell and VLR associated with the terminal 102, as well as user profiles such as the International Mobile Subscriber Identity Number (IMSI) of all GPRS users registered with this SGSN. Another network element introduced in the GPRS context is the Gateway GPRS Support Node (GGSN) 128, which acts as a gateway between the GPRS network 112 and a packet switched public data network, such as data network 130. This gateway 128 allows mobile subscribers to access the public data network 130 or specified private IP networks. The connection between the GGSN 128 and the public data network is generally enabled through a standard protocol, such as the Internet Protocol (IP).

As previously indicated, the RSS includes components such as terminals, and the BSS which in turn generally includes a plurality of BTSs and a BSC. The BTS includes radio components such as a transceiver and antenna, while the BSC effects switching between BTSs, manages network resources, etc. The RSS supports a certain number of logical channels that fall within two primary categories including the traffic channels (TCH) and the control channels (CCH). The TCHs are intended to carry data such as encoded speech or user data in circuit switched mode, while Packet Data TCHs (PDTCH) are intended to carry user data in packet switched mode. Multiple full rate channels and multiple packet data TCHs can be allocated to the same terminal, which is referred to as multislot configurations and multislot packet configurations respectively. Control channels carry signaling and/or synchronization data. There are various primary control channel categories in GSM systems, including broadcast, common, dedicated, and CTS control channels. The broadcast channels include Frequency Correction Channels (FCCH), Synchronization Channels (SCH), a Broadcast Control Channel (BCCH) as well as Packet BCCH (PBCCH) channels.

The interface between the network and a mobile terminal is often referred to as the radio interface. Radio Resource management (RR) and/or MSC procedures are used to establish, maintain, and release connections that allow a point-to-point dialogue between the network and the terminal. These procedures include "handover" procedures. Handover generally refers to the passing of a call in progress from one channel or cell to another. For example, inter-cell handover refers to the passing of a call from one cell coverage area to another. This typically occurs where the terminal is moving such that it is proximate the border of the cell area, and signal measurements indicate that a transfer of the call to the bordering cell is required or otherwise desirable to ensure proper radio signal quality. Intra-cell handover generally refers to a handover from one channel/timeslot configuration in the serving cell to another channel/timeslot configuration in the same cell. Such a handover may be performed to address interference issues, reduce network congestion, or the like.

Various link control functions are performed between the terminal and its associated BSS, including functions such as handover control, measurement collection and processing, and transmitter power control. Regarding power control issues, it is important that terminals that are sending data to the network use the correct power level. If the terminal power levels are too low, data throughput may suffer due to increased errors resulting from these poor radio conditions. If the terminal power levels are too high, power consumption is not optimal, and other problems such as transmission interference to other channels used by other terminals can occur.

To address these issues, the terminal and the network communicate information relating to the power levels to be used by the terminal. This is generally referred to as adaptive control of the radio frequency (RF) transmit or output power. In GPRS networks, the terminal calculates the correct output power levels based on formulas. Such formulas may include sets of parameters of which the terminal is to obtain from various sources, such as system information messages broadcasted by the network, or from control messages that are sent specifically to each of the terminals. The broadcasted system information messages are currently transmitted by the network in two possible logical channel structures, depending on the base selected by the network operator. For example, if a packet channel structure exists, the system information messages are transmitted by the network on the PBCCH, which is a downlink signal (i.e. from network to terminal) used to broadcast cell-specific information. If a packet channel structure does not exist, the system information messages are broadcasted by the network on the BCCH, which is also a downlink signal used to broadcast cell-specific information.

Based at least in part on the information received by the terminal from the network, the terminal can calculate the output power to which it will transmit data on each individual uplink packet data channel (PDCH). For example, one current formula by which the terminal can calculate its output power is provided in the $3^{rd}$ Generation Partnership Project (3GPP) technical specification 3GPP TS 45.008, V6.6.0, February 2004, entitled "Technical Specification Group GSM/EDGE Radio Access Network; Radio subsystem link control (Release 6) (hereinafter referred to as "TS 45.008"), the content of which is incorporated by reference in its entirety. An output power formula provided by TS 45.008 is shown in Equation 1 below:

$$P_{CH} = \min(\Gamma_0 - \Gamma_{CH} - \alpha^*(C+48), PMAX) \quad \text{Equation 1}$$

In Equation 1, $P_{CH}$ represents the RF output power, and the formula provides a manner in which the terminal can calculate a substantially minimal RF output power while maintaining the quality of the radio links. The channel RF output power, $P_{CH}$, thus represents the minimum of 1) the maximum allowed output power in the cell (PMAX); and 2) the calculation of $\Gamma_0 - \Gamma_{CH} - \alpha^*(C+48)$. These values/variables are described below:

| | |
|---|---|
| $\Gamma_{CH}$ | is an MS and channel specific power control parameter, sent to the MS in a Radio Link Control (RLC) control message (see 3GPP TS 44.060). For those uplink Packet Data Channels (PDCHs) for which $\Gamma_{CH}$ has not been defined, the value 0 is used; |
| $\Gamma_0$ | = 39 dBm for GSM 400, GSM 700, GSM 850 and GSM 900<br>= 36 dBm for DCS1 800 and PCS 1900; |
| $\alpha$ | is a system parameter, broadcast on PBCCH or optionally sent to the MS in an RLC control message (see 3GPP TS 44.018 and 3GPP TS 44.060); |
| C | is the normalized received signal level at the MS as defined in TS 45.008, §10.2.3.1; and |
| PMAX | is the maximum allowed output power in the cell, and equals:<br>a) GPRS_MS_TXPWR_MAX_CCH if PBCCH or CPBCCH exist; or<br>b) MS_TXPWR_MAX_CCH otherwise |

As can be seen from Equation 1, PMAX represents a key component of the formula, as the result of the calculation of $\Gamma_0 - \Gamma_{CH} - \alpha^*(C+48)$ is irrelevant if it is not lower than PMAX.

As previously indicated, PMAX is received in system information messages. For example, when received via the BCCH, information elements including RR information elements may provide the PMAX. One such information element is defined in 3GPP TS 44.018, V6.6.0, February 2004, entitled "Technical Specification Group GSM/EDGE Radio Access Network; Mobile radio interface layer 3 specification; Radio Resource Control (RRC) protocol (Release 6) (hereinafter referred to as "TS 44.018"), the content of which is incorporated by reference in its entirety. This information element is the "cell selection parameters" information element which provides a variety of information about a cell, including the maximum allowed output power in the cell (e.g., PMAX). In accordance with TS 44.018, the PMAX value of the cell selection parameters information element is coded as shown in Table 1 below:

TABLE 1

| 8 | 7 | 6 | 5 | 4 | 3 | 2 | 1 | |
|---|---|---|---|---|---|---|---|---|
|   |   |   |   |   |   |   |   | octet 1 |
|   |   |   | MS_TXPWR_MAX_CCH |   |   |   |   | octet 2 |
|   |   |   |   |   |   |   |   | octet 3 |

The PMAX value is provided in the 5-bit field MS_TXPWR_MAX_CCH of octet 2, and is coded as the binary representation of the power control level corresponding to the maximum transmission power level a terminal may use when accessing on a Control Channel (CCH) and/or Traffic Channel (TCH). MS_TXPWR_MAX_CCH is thus broadcasted on the BCCH of the cell. A similar 5-bit field, GPRS_MS_TXPWR_MAX_CCH, is broadcasted on PBCCH or Compact PBCCH (CPBCCH) of the serving cell where such channel is provided by the network (see 3GPP TS 44.060). The particular value MS_TXPWR_MAX_CCH or GPRS_MS_TXPWR_MAX_CCH, having a range of 0-31, is then used by the terminal for defining PMAX when calculating the RF output power $P_{CH}$ as shown in Equation 1 above.

According to TS 44.018, the cell selection parameters information element is included in system information messages which are sent to the terminal. More particularly, the cell selection parameters information element (and consequently the MS_TXPWR_MAX_CCH value) is provided in system information types 3 and 4. System information types 3 and 4 are messages sent on the BCCH by the network. In this manner, the terminal can receive the value to be used as PMAX in the calculation of the appropriate RF output power.

Analogously, the value for PMAX may be received via other channels, such as the PBCCH where packet channel structure exists. For example, in the GPRS context, the PBCCH is a unidirectional point-to-multi-point signaling channel from the network to the terminals, and is used to broadcast information to terminals relating to the GPRS radio network organization. In addition to GPRS-specific information, the PBCCH may also broadcast system information about circuit switched services so that a GSM/GPRS terminal does not need to also listen to the BCCH. Packet system information, including a value for PMAX, is provided via the PBCCH in a manner analogous to that described for the BCCH. For example, a packet system information type 3 message is sent by the network on the PBCCH or Packet Associated Control Channel (PACCH) giving information of the BCCH allocation in the neighbor cells and cell selection parameters for serving cell and non-serving cells, where the cell selection parameters include the GPRS_MS_TXPWR_MAX_CCH field.

The RF output power calculation and comparison of Equation 1 provides an acceptable calculation when the terminal idle state and temporary block flow (TBF) state operate within the same band. But when they are not, a problem arises. As previously described, the MS_TXPWR_MAX_CCH (or GPRS_MS_TXPWR_MAX_CCH) field shown in Table 1 is a binary representation of the power control level corresponding to the maximum transmission power level that a terminal may use when accessing on a control channel. However, the power control level and corresponding nominal output power may differ depending on the frequency bands associated with the idle and TBF states. For example, the nominal output power in dBm for the power control level (e.g., MS_TXPWR_MAX_CCH) for different frequency bands are shown in FIGS. 2A and 2B. FIG. 2A illustrates the nominal output powers 200A, and corresponding power control levels 202A provided by way of the MS_TXPWR_MAX_CCH field, for GSM systems operating in the 400, 900, 850, and 700 MHz frequency bands. FIG. 2B illustrates the nominal output powers 200B and corresponding power control levels 202B for a Digital Cellular System (DCS) system operating in the 1800 MHz frequency band.

The tables of FIGS. 2A and 2B are merely representative of different systems/bands and the power control levels associated therewith, and are presented for purposes of facilitating an understanding of at least one problem associated with prior art RF output power control. As an example, in idle state, the terminal may be receiving system information messages via the BCCH/PBCCH in the 900 MHz band. In this case, the system information messages include an information element(s) including the MS_TXPWR_MAX_CCH information. Assuming for purposes of example that the MS_TXPWR_MAX_CCH provides a value of "8," this corresponds to nominal output power of 27 dBm as depicted at block 204A of FIG. 2A. Thus, in the GSM 900 system, PMAX is 27 dBm based on the value of "8" received via the system information message.

The terminal user may then want to establish a data connection(s), where the network has allocated the traffic channel in the DCS 1800 MHz band. As shown at block 204B of FIG. 2B, the power control level 202B of "8" corresponds to a nominal output power 200B of "14 dBm." Thus, in situations such as this where different power tables are specified for idle and transfer states in different frequency bands, it is unclear as to what nominal output power level, 200A or 200B, should be used by the terminal in the RF output power calculation. Terminals have difficulties in using the correct output power when the Packet Data Traffic Channel (PDTCH) or other traffic channel is mapped on a different frequency band than the common channels BCCH/PBCCH.

Thus, because terminals are able to use different frequency bands in different operational modes (e.g., IDLE and TRANSFER/TBF modes), and because the power control levels may not identify a common nominal output power level for different cellular systems and/or frequency bands, a problem in establishing the proper RF output power may result.

Further, other modes may present similar problems, such as in the case of Dual Transfer Mode (DTM), where the terminal is capable of operating simultaneously in both packet-switched and circuit-switched modes. DTM after handover presents issues in establishing the proper output power level, as the terminal has no way of obtaining the correct power level parameters.

The present invention addresses these and other problems and shortcomings of the prior art. For example, the present invention enables the terminal to use the correct power level where the common broadcast channel (e.g., BCCH, PBCCH, and/or the like) is mapped on a different band than the traffic channel. By ensuring the correct power level at the terminal, the quality of the radio path is improved significantly. This correct power level can be provided to the terminal even though the common broadcast channel(s) is mapped on a different band than the traffic channel(s), and/or in the case of handovers and DTM or other similar situations.

In accordance with one embodiment of the present invention, an additional parameter(s) is provided in an assignment message. The additional parameter(s) provides the maximum terminal output power level that the terminal shall use. By providing such information in an assignment message, the terminal output power level can be controlled in situations that are not accounted for when providing an output power level via a broadcast channel such as the BCCH, PBCCH, etc. For example, the maximum terminal output power level can be provided in an initial assignment message provided to allocate a channel to the terminal during establishment of a connection. Further, in situations involving DTM, handover or other situations involving changing circumstances, the maximum terminal output power level can be provided with the corresponding channel assignment message(s).

More particularly, Radio Resource management (RR) involves, among other things, allocating access resources to the terminal on demand and for the duration of the call/session. RR procedures also manage the continued connection even while the terminal user is on the move. When the terminal wants to initiate access the network, it sends a service request or other similar message to the network. For example, the terminal may send a channel request message on the Random Access Channel (RACH), which is an uplink channel used to request a Dedicated Control CHannel (DCCH). The network responds with an immediate assignment message (or other assignment message) that includes a description of the assigned channel, and thus allocates a dedicated channel for the terminal.

The immediate assignment procedure may be triggered by a mobile-originating service request as described above, or may be triggered by other means such as by a paging request from the network to the terminal. A paging procedure is used to locate a terminal to which a connection is to be established. Upon receipt of the paging request message, the targeted terminal initiates the immediate assignment procedure. Thus, the immediate assignment procedure may be initiated by the terminal whether the terminal initiates access to the network or is being paged to be involved in a connection. In other words, the immediate assignment procedure can be initiated by the RR entity of the terminal, where initiation is triggered by request from the MM sublayer or LLC layer to enter the "dedicated mode," or by the RR entity in response to a paging request message In accordance with one embodiment of the present invention, various channel assignment messages are modified to include parameters to indicate the proper maximum terminal output power. In a more particular embodiment, a new parameter is defined to identify the maximum output power level that the terminal shall use instead of the conventional output power level specified by the network in broadcast messages such as the BCCH, PBCCH, etc.

Figure 3A:
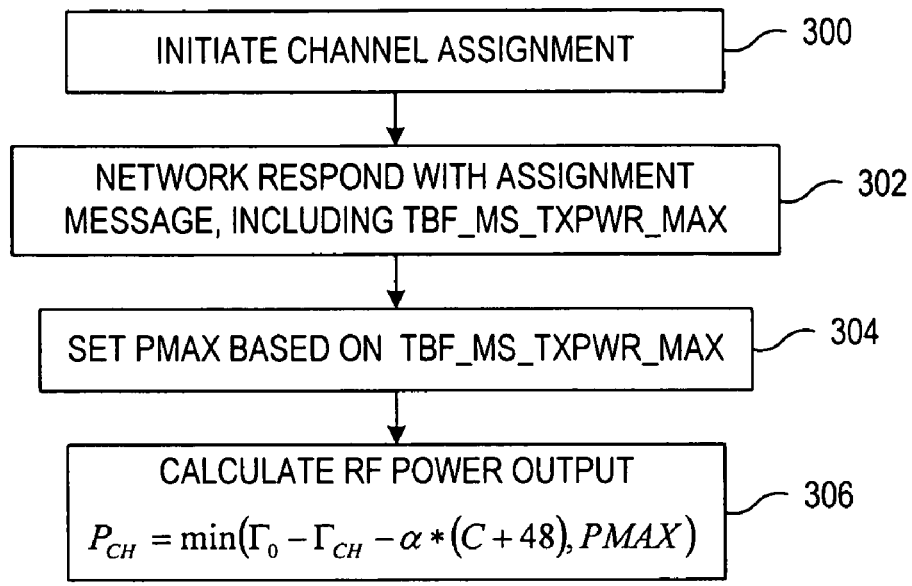
FIGS. 3A and 3B are flow diagrams illustrating representative embodiments of the present invention where maximum terminal output power is provided via channel assignment messages.

FIG. 3A is a flow diagram illustrating one representative embodiment of the present invention, where maximum terminal output power is provided via a channel assignment message. A channel assignment is initiated 300. This may occur in response to a variety of actions. For example, the terminal may want to initiate a connection, and thus sends a channel request message on, for example, the RACH. Alternatively, a paging request may be received at the terminal, which in turn sends the channel request message. Other situations such as handover may also result in the initiation 300 of the channel assignment request.

The network responds 302 with a channel assignment message, which includes a new parameter, depicted as TBF_M-S_TXPWR_MAX, that includes the maximum terminal output power level that the terminal should use. Alternatively, the network may provide an assignment message in some cases without initiation or other request from the terminal. In either case, the network provides an assignment message including the new parameter designating the maximum terminal output power level for use by the terminal. This new value TBF_M-S_TXPWR_MAX is used to define the value PMAX as shown at block 304, thereby allowing the terminal to calculate 306 the RF output power using the formula previously shown in Equation 1. For example, in one embodiment, the new parameter (e.g., TBF_MS_TXPWR_MAX) may represent the actual value to be used as the PMAX value. In another embodiment, the new parameter includes a digital representation of a value used to identify the proper PMAX value. For example, the new parameter may include a binary representation (e.g., bits) of an index to a table or other data structure from which the actual PMAX value is identified. In any case, the terminal output power level to be used as the terminal's output power level is defined using this new parameter (e.g., the maximum terminal output power level value) received via the assignment message.

Figure 3B:
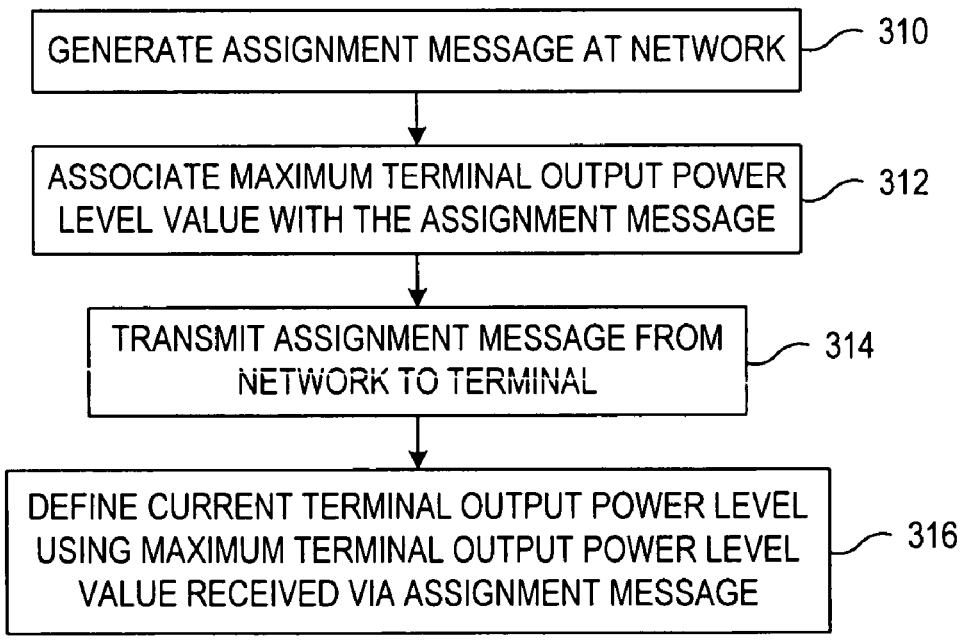

FIG. 3B is a flow diagram illustrating another representative embodiment of the invention using a network assignment message to provide the maximum terminal output power parameter. An assignment message is generated 310 at the network. A maximum terminal output power level parameter is associated 312 with the assignment message, and the assignment message is transmitted 314 from the network to the terminal. The terminal then defines 316 the current, proper terminal output power level using the maximum terminal output power level provided via the assignment message. As indicated above, this definition of the terminal output power level is performed using the maximum terminal output power level, which may represent the actual value to be used in a formula for calculating the terminal output power level, or may represent an index to a table or other indirect manner of identifying the proper formula value.

In accordance with one embodiment of the present invention, the terminal may make the RF output power determination based on a PMAX value provided in an assignment message according to the present invention, and/or using a PMAX value provided via the BCCH, PBCCH, or other signaling channel by way of system information elements. An example of such an embodiment is illustrated in FIG. 4, which presents a flow diagram for using one of a plurality of possible maximum power output levels for use at the terminal.

Figure 4:
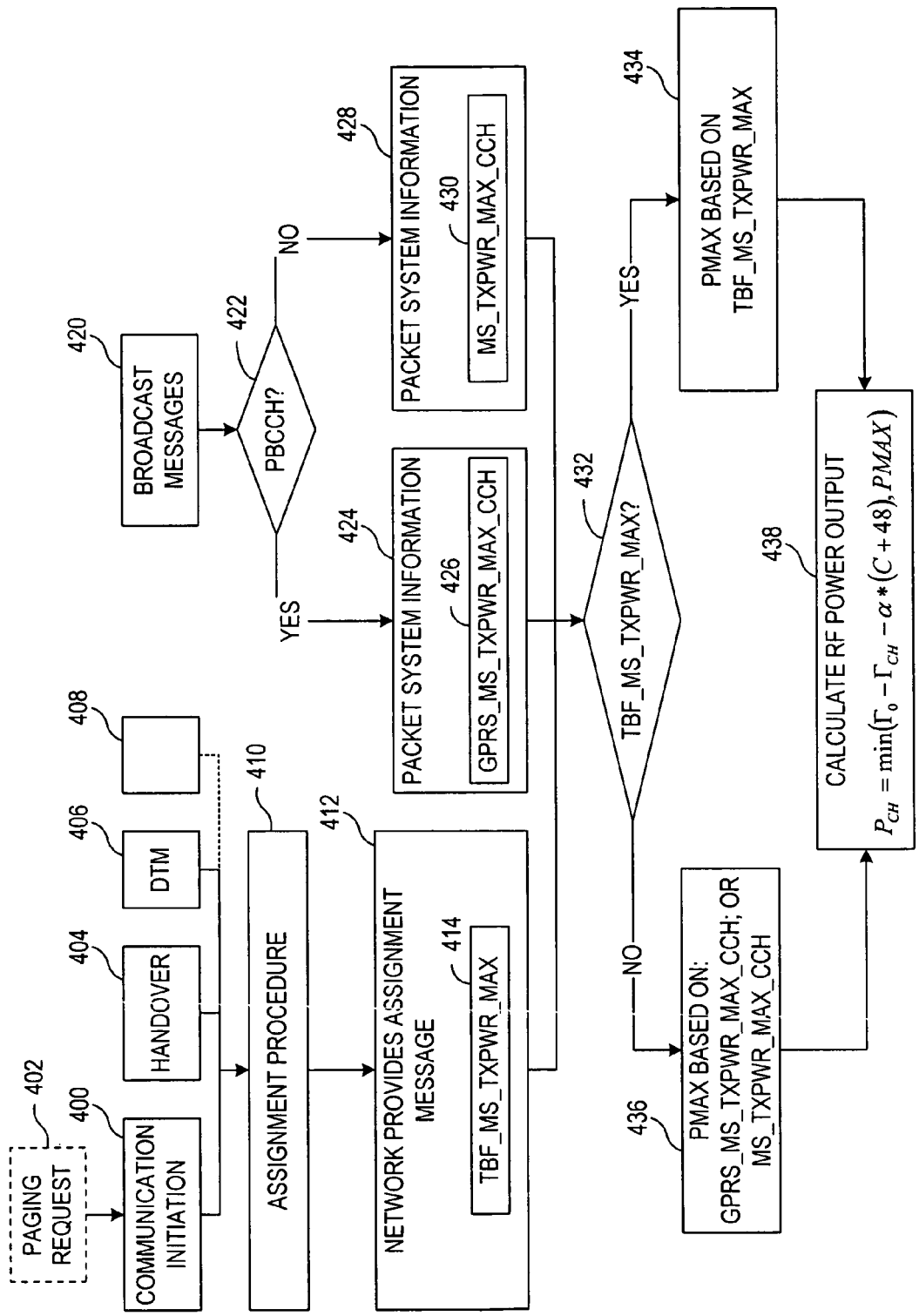
FIG. 4 presents a flow diagram for using one of a plurality of possible maximum power output levels for use at the terminal.

Referring to FIG. 4, a number of different functions may occur in which a channel assignment message will be generated by the network and provided to the terminal. For example, a communication may be initiated as shown at block 400. A terminal may initiate such a communication, such as when the terminal is initiating a voice call or data session with other entities coupled to the network. Such a communication may be initiated by another network entity, such as another mobile device targeting the terminal. In such case a paging request 402 may be sent to the terminal. Other functions may involve the network generation of an assignment message, such as a handover 404, operations via the Dual Transfer Mode (DTM) 406, or other 408 operation where changing circumstances may involve a channel assignment message. In any of these cases, an assignment procedure 410 is invoked, resulting in the network responding with, or otherwise providing, an assignment message as shown at block 412. In accordance with the present invention, such an assignment message may be supplied with the new parameter, shown as the TBF_MS_TXPWR_MAX 414 parameter which defines the maximum transmission power level that the terminal is to currently use.

In addition, broadcast messages 420 are still provided by the network which may be used to establish the maximum transmission power level that the terminal is to use as its output power level, as is currently used in RR management procedures. For example, broadcast messages via the BCCH, PBCCH or other similar channel may provide the maximum transmission power level that the terminal is to use as its output power level, such as via the previously discussed fields MS_TXPWR_MAX_CCH and/or GPRS_MS_TXPWR_MAX_CCH. More particularly, if the broadcast message is via the PBCCH as determined at decision block 422, the packet system information 424 includes the GPRS_MS_TXPWR_MAX_CCH 426. Otherwise, the broadcast message may be via the BCCH, and the associated packet system information 428 includes the MS_TXPWR_MAX_CCH 430.

In accordance with one embodiment of the present invention, it is determined 432 whether a maximum power output value has been provided via an assignment message, which will be given deference relative to a maximum power output value provided via a broadcast channel. In the illustrated embodiment, it is determined 432 whether the parameter TBF_MS_TXPWR_MAX has been provided via an assignment message. If so, then PMAX is set 434 based on the value provided via the TBF_MS_TXPWR_MAX parameter. For example, if TBF_MS_TXPWR_MAX directly provides the maximum power output level that can be used by the terminal, then PMAX is set to equal TBF_MS_TXPWR_MAX. On the other hand, TBF_MS_TXPWR_MAX may indirectly provide the maximum power output level, such as by providing an index to a table, or other reference to the actual maximum power output level. If the TBF_MS_TXPWR_MAX parameter has not been provided by an assignment message, then PMAX is set 436 based on the appropriate value depending on which network system and broadcast channel is being employed. For example, the GPRS_MS_TXPWR_MAX_CCH may be used to define PMAX where the information is provided via the PBCCH, and the MS_TXPWR_MAX_CCH may be used to define PMAX where the information is provided via the BCCH.

At this point, the terminal has the value to use as or otherwise define the PMAX. As indicated above, PMAX may be provided via an assignment message(s) and/or via a broadcast channel(s). When this value is received, the terminal may then calculate 438 the RF output power for the terminal to use, based Equation 1. The definitions associated with Equation 1 may then be modified to reflect the additional options for the value PMAX as follows:

PMAX is the maximum allowed output power in the cell, and is determined using:
  a) GPRS_MS_TXPWR_MAX_CCH if PBCCH or CPBCCH exist; or
  b) MS_TXPWR_MAX_CCH otherwise; unless
  c) TBF_MS_TXPWR_MAX is provided by the Network, in which case terminal shall use TBF_MS_TXPWR_MAX rather than either GPRS_MS_TXPWR_MAX_CCH or MS_TXPWR_MAX_CCH.

In this manner, an accurate PMAX value or index to the PMAX value is provided via the broadcast channels when the idle band and TBF state operate within the same band, and an accurate PMAX value or index to the PMAX value is provided via assignment messages under changing circumstances such as when the idle band and TBF state do not operate within the same band, in connection with network-originated or mobile-originated handover, in connection with DTM operations, etc.

In order to provide the TBF_MS_TXPWR_MAX value in assignment messages, the structure and/or content of various assignment messages may be changed in accordance to the present invention. While various acceptable manners are possible for changing such assignment messages, representative examples are provided below to facilitate an understanding of this aspect of the present invention.

A first example is described in connection with 3GPP TS 44.018, which specifies the procedures used at the radio interface for Radio Resource (RR) management, and more particularly the layer 3 specification for the Radio Resource Control (RRC) protocol. The RRC serves as the primary intelligence of the radio interface, and employs signaling protocols to perform various control functions, including the assignment of radio resources. Thus, the RRC involves the use of channel assignment messages, in which maximum terminal output power levels may be provided in accordance with the present invention.

In 3GPP TS 44.018, the RR procedures related to packet resource establishment while in dedicated mode relates to the establishment of a packet resource by procedures on the main Dedicated Control CHannel (DCCH) when a terminal supporting both GPRS and DTM is in dedicated mode. A packet request procedure is initiated by the terminal using the main DCCH to establish a packet resource to support the transfer of Logical Link Control (LLC) Protocol Data Units (PDUs) from the terminal to the network. For example, upon receipt of a DTM request message, the network may allocate an "uplink" packet resource that is assigned to the terminal in a DTM assignment message, such as a DTM assignment command or packet assignment message. In accordance with one embodiment of the invention, and in the case of DTM establishment after handover, the network shall include the new parameter TBF_MS_TXPWR_MAX into the assignment message. In this manner, the proper maximum terminal output power level that the terminal should use is provided to the terminal in such a circumstance.

The packet "downlink" assignment procedure in dedicated mode may be used to establish a packet resource to support the transfer of LLC PDUs in the direction from the network to the terminal. In such case, the network may initiate the packet downlink assignment procedure in dedicated mode by sending a DTM assignment message on the main DCCH. Again, in accordance with one embodiment of the invention, and in the case of DTM establishment after handover, the network shall include the new parameter TBF_MS_TXPWR_MAX into the assignment message.

Another embodiment involves messages for RR management, and in particular the case of immediate assignment. The purpose of the immediate assignment procedure (including an "immediate assignment extended" procedure) is to establish an RR connection between the terminal(s) and the network. An immediate assignment message is sent by the network to the terminal in idle mode to change the channel configuration to a dedicated configuration while staying in the same cell, or to the terminal in packet idle mode to change the channel configuration to either an uplink or a downlink packet data channel configuration in the cell. The immediate assignment message content includes various information elements, including an immediate assignment (IA) Rest Octets information element. According to 3GPP TS 44.018, the IA Rest Octets information element contains spare bits and possibly either a packet uplink assignment construction, a packet downlink assignment construction, a second part packet assignment construction or frequency parameters, before time construction. FIG. 5 illustrates a representative code segment for a type 5 IA Rest Octets information element, incorporating a maximum terminal output power level that the terminal shall use.

As shown in FIG. 5, the information element 500 includes code for an Enhanced GPRS (EGPRS) Packet Uplink Assignment 502, a Packet Uplink Assignment 504, and a Packet Downlink Assignment 506. Referring first to the EGPRS Packet Uplink Assignment 502, the representative TBF_MS_TXPWR_MAX field 508 is a five-bit field, and is the binary representation of the PMAX value for terminal output power control as previously described. A similar TBF_MS_TXPWR_MAX field 510 is provided for multi-block allocation. The Packet Uplink Assignment 504, and the Packet Downlink Assignment 506 include similar TBF_MS_TXPWR_MAX fields 512, 514 respectively. The examples of FIG. 5 thus illustrate representative examples of modifications to immediate assignment messages by which the correct output power can be provided when the PDTCH is mapped on a different band than the common channels BCCH, PBCCH, or the like.

Another representative embodiment involves DTM Assignment Commands and/or Packet Assignment messages. A DTM Assignment Command message is sent on the main DCCH by the network to the terminal to change the channel configuration to a configuration with circuit-switched (CS) and packet-switched (PS) connections when no timing adjustment is needed and reallocation of the CS timeslot is required. A Packet Assignment message is sent on the main DCCH by the network to the terminal to change the channel configuration to a multislot configuration with CS and PS connections when neither timing adjustment nor reallocation of the CS timeslot is needed. The DTM Assignment Command and Packet Assignment messages include various information elements including a description of the Uplink Packet Channel Assignment and a description of the Downlink Packet Channel Assignment. Thus, for such a assignment commands, information elements may be used to provide the TBF_MS_TXPWR_MAX information in accordance with the present invention.

Figure 6A:
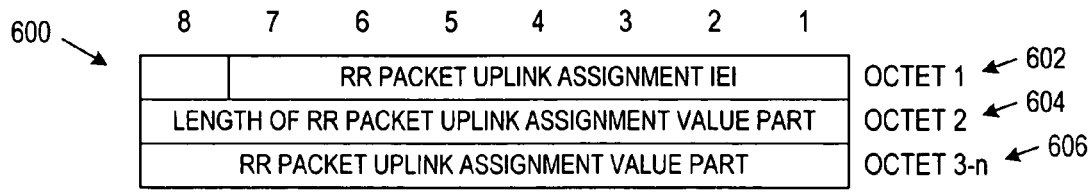
FIG. 6A illustrates a representative RR packet uplink assignment information element in accordance with one embodiment of the invention.
Figure 6B:
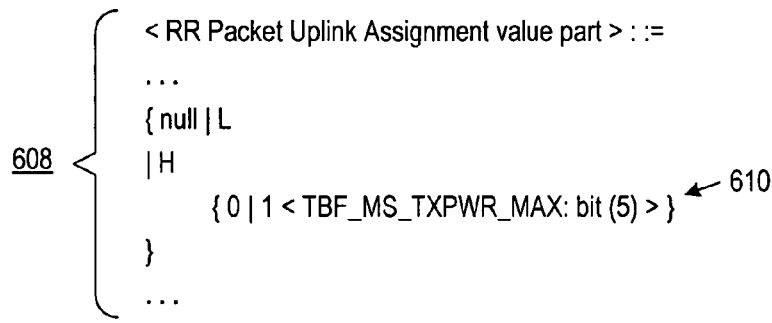
FIG. 6B illustrates an exemplary embodiment of a corresponding code segment for the RR packet uplink assignment information element of FIG. 6A.

FIG. 6A illustrates a representative RR packet uplink assignment information element, and FIG. 6B illustrates an example of a corresponding code segment for such an RR packet uplink assignment information element. The representative RR packet uplink assignment information element 600 includes various octets 602, 604, through 606. One or more of the octets 606 include the RR packet uplink assignment value part. A representative code segment 608 of such a value part is shown in FIG. 6B, where the representative TBF_MS_TXPWR_MAX field 610 is a five-bit field, and is the binary representation of the PMAX value for terminal output power control as previously described. In the event of DTM establishment after handover, the network shall include TBF_MS_TXPWR_MAX into the assignment message.

Figure 7A:
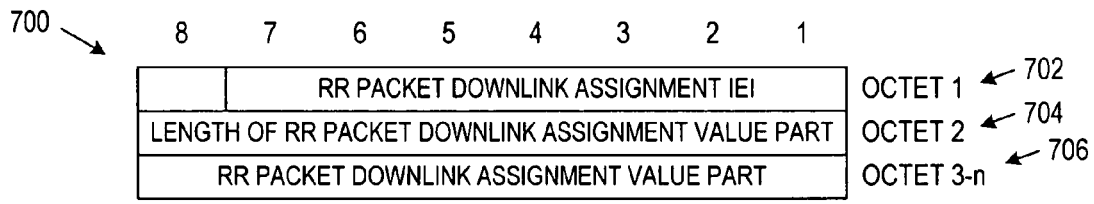
FIG. 7A illustrates a representative RR packet downlink assignment information element in accordance with one embodiment of the invention.
Figure 7B:
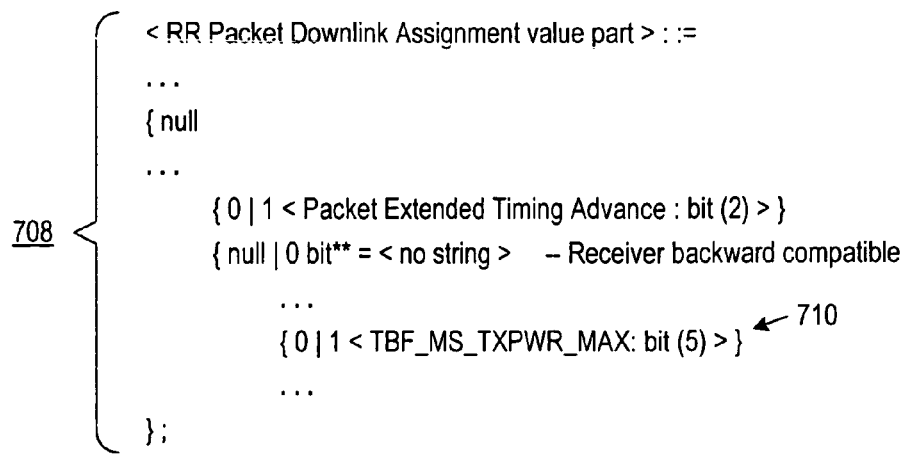
FIG. 7B illustrates an exemplary embodiment of a corresponding code segment for the RR packet downlink assignment information element of FIG. 7A.

Analogously, FIG. 7A illustrates a representative RR packet downlink assignment information element, and FIG. 7B illustrates an example of a corresponding code segment for such an RR packet downlink assignment information element. The representative RR packet downlink assignment information element 700 includes various octets 702, 704, through 706. One or more of the octets 706 include the RR packet downlink assignment value part. A representative code segment 708 of such a value part is shown in FIG. 7B, where the representative TBF_MS_TXPWR_MAX field 710 again is a five-bit field, and is the binary representation of the PMAX value for terminal output power control, and in the event of DTM establishment after handover, the network shall include TBF_MS_TXPWR_MAX into the assignment message.

As previously indicated, various acceptable manners are possible for changing assignment messages. Further representative examples are provided below to facilitate an understanding of this aspect of the present invention. Anther example is described in connection with 3GPP TS 44.060, which specifies the GPRS MS-to-base station interface, and more particularly the Radio Link Control/Medium Access Control (RLC/MAC) of packet data physical channels. RLC/MAC control messages on the PDCH include uplink TBF establishment messages, which includes a Packet Uplink Assignment message. The RLC/MAC control messages also include downlink TBF establishment messages, including a Packet Downlink Assignment message. The maximum terminal output power level TBF_MS_TXPWR_MAX may be provided in such assignment messages, as described below.

First considering the Packet Downlink Assignment message, this message is sent on the Packet Common Control Channel (PCCCH) or Packet Associated Control Channel (PACCH) by the network to the terminal to assign downlink resources to the terminal. A representative example of code segments from Packet Downlink Assignment information elements is illustrated in FIG. 8. The information element 800 includes code for Packet Downlink Assignment message content. Among this code, the representative TBF_MS_TXPWR_MAX field 802 is included as a five-bit field, and is the binary representation of the PMAX value for terminal output power control as previously described.

Next considering the Packet Uplink Assignment message, this message is sent on the PCCCH or PACCH by the network to the terminal to assign uplink resources. A representative example of code segments from Packet Uplink Assignment information elements is illustrated in FIG. 9. The information element 900 includes code for Packet Uplink Assignment message content, and includes code for a single block allocation structure 902. Among this code, the representative TBF_MS_TXPWR_MAX field 904 is included as a five-bit field, and is the binary representation of the PMAX value for terminal output power control as previously described. Analogously, the information element 900 includes code for a multi block allocation structure 906, where the representative TBF_MS_TXPWR_MAX field 908 is included as a binary representation of the PMAX value for terminal output power control.

Each of the foregoing examples of assignment messages are provided as examples of assignment messages in which the TBF_MS_TXPWR_MAX may be provided in accordance with the present invention. The present invention is equally applicable to other assignment messages.

Figure 10:
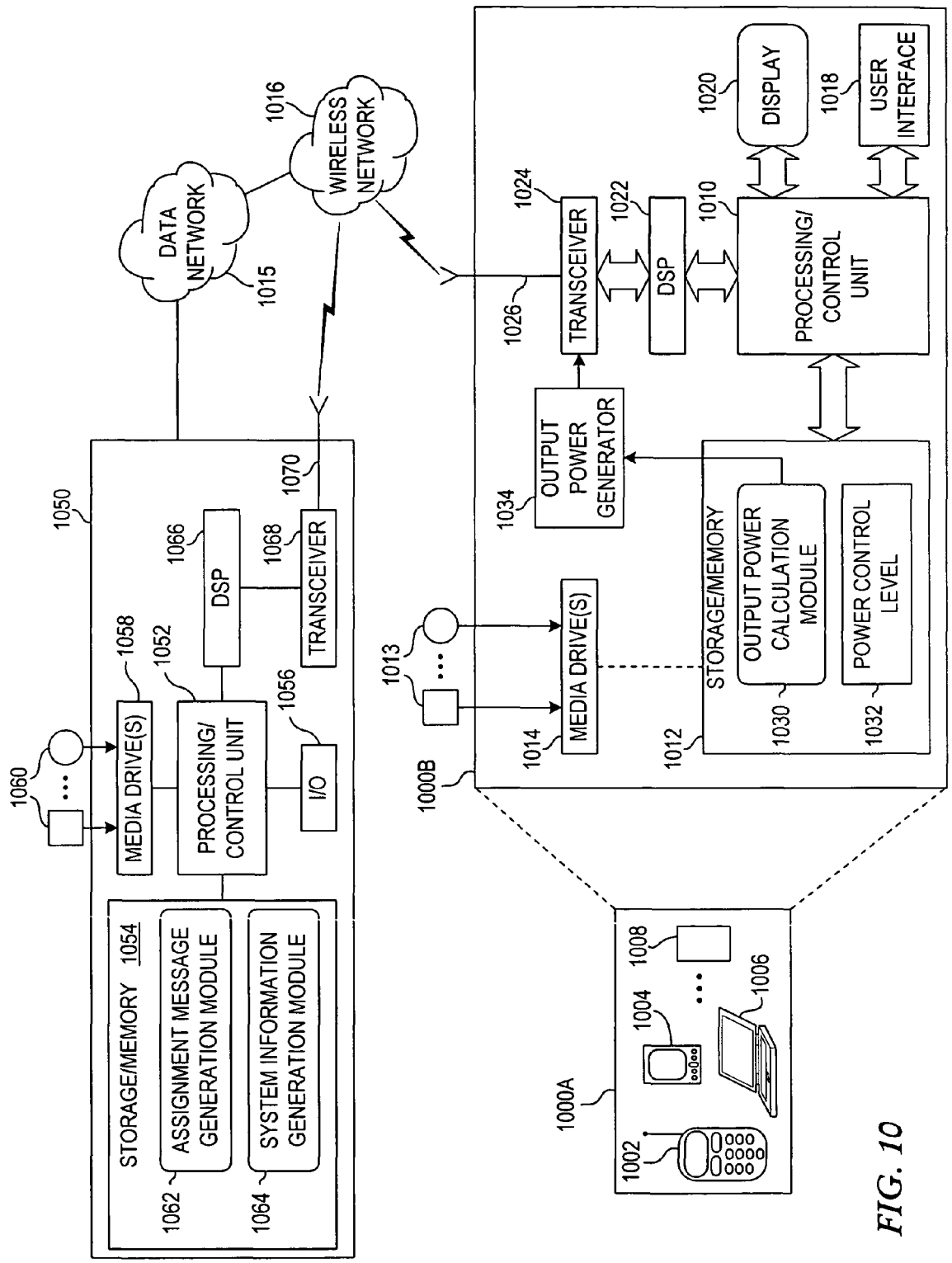
FIG. 10 illustrates a representative system in which the present invention may be implemented or otherwise utilized.

Hardware, firmware, software or a combination thereof may be used to perform the functions and operations in accordance with the invention. The terminals in accordance with the invention include any communication device capable of communicating over-the-air (OTA) with wireless networks. Such terminals include, for example, mobile phones, Personal Digital Assistants (PDAs), computing devices, and other wireless communicators. A representative system in which the present invention may be implemented or otherwise utilized is illustrated in FIG. 10.

The system includes one or more terminals 1000A such as, for example, a mobile phone 1002, PDA 1004, computing device 1006, or other communication device 1008 capable of OTA communication. The terminal 1000A utilizes computing systems to control and manage the conventional device activity as well as the functionality provided by the present invention. For example, the representative terminal 1000B includes a processing/control unit 1010, such as a microprocessor, controller, reduced instruction set computer (RISC), or other central processing module. The processing unit 1010 need not be a single device, and may include one or more processors. For example, the processing unit may include a master processor and one or more associated slave processors coupled to communicate with the master processor.

The processing unit 1010 controls the basic functions of the terminal 1000B as dictated by programs available in the program storage/memory 1012. The storage/memory 1012 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 1012 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 1013, such as disks, CD-ROM, DVD, or the like, which are read by the appropriate media drive(s) 1014. The relevant software for carrying out terminal operations in accordance with the present invention may also be transmitted to the terminal 1000B via data signals, such as being downloaded electronically via one or more networks, such as the data network 1015 or other data networks, and an intermediate wireless network(s) 1016.

For performing other standard terminal functions, the processor 1010 is also coupled to user-interface (UI) 1018 associated with the terminal 1000B. The UI 1018 may include, for example, a keypad, function buttons, microphone, joystick, scrolling mechanism (e.g., mouse, trackball), touch pad/screen, or other user entry mechanisms (not shown). These and other UI components are coupled to the processor 1010 as is known in the art. A display device 1020 may also be associated with the terminal 1000B.

The illustrated terminal 1000B also includes conventional circuitry for performing wireless transmissions over the wireless network(s) 1016. The DSP 1022 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1024 transmits outgoing radio signals and receives incoming radio signals, generally by way of an antenna 1026.

In one embodiment, the storage/memory 1012 stores the various client programs used in connection with the present invention. For example, the storage/memory 1012 includes storage to store the maximum power control level 1032 provided via the network 1016 to the terminal 1000B. The storage/memory 1012 also includes an output power calculation module 1030, operable in connection with the processor 1010 in one embodiment of the present invention. In one embodiment, the output power calculation module 1030 includes software and/or firmware operable with the processor 1010 to define the terminal output power level that is to be used by the terminal, such as performing the calculation shown in Equation 1 above. Based on the defined value, the output power generation module 1034 establishes the proper output power for which the transceiver 1024 is to transmit communication signals. These terminal modules are representative of the types of functional modules that may be provided on a terminal in accordance with the invention, and are not intended to represent an exhaustive list.

FIG. 10 also depicts a representative computing system 1050 operable on the network for generating the messages to the terminal to provide at least the maximum terminal output power level for use by the terminal in establishing the proper terminal output power. In one embodiment of the invention, the computing system 1050 represents a Base Station System (BSS). Alternatively, the functionality described for the computing system 1050 in FIG. 10 may be provided in other network entities that communicate assignment messages and/or system information messages to terminals.

In one embodiment, the computing system 1050 includes a processing arrangement 1052, which may be coupled to the storage/memory 1054. The processor 1052 carries out a variety of standard computing functions as is known in the art, as dictated by software and/or firmware instructions. The storage/memory 1054 may represent firmware, media storage, and/or memory. The processor 1052 may communicate with other internal and external components through input/output (I/O) circuitry 1056. The computing system 1050 may also include media drives 1058, such as hard and floppy disk drives, CD-ROM drives, DVD drives, and other media 1060 capable of reading and/or storing information. In one embodiment, software for carrying out the operations at the computing system 1050 in accordance with the present invention may be stored and distributed on CD-ROM, diskette, removable memory, or other form of media capable of portably storing information, as represented by media devices 1060. Such software may also be transmitted to the system 1050 via data signals, such as being downloaded electronically via a network such as the data network 1015, Local Area Network (LAN) (not shown), wireless network 1016, and/or any combination thereof.

In accordance with one embodiment of the invention, the storage/memory 1054 and/or media devices 1060 store the various programs and data used in connection with the present invention. For example, the assignment message generation module 1062 is operable with the processor 1052 to generate the various channel assignment messages that incorporate the maximum terminal output power level value (e.g., TBF_MS_TXPWR_MAX) for transmission to the terminal 1000B. A system information generation module 1064 may also be provided to transmit system information messages including maximum terminal output power levels (e.g., MS_TXPWR_MAX_CCH, GPRS_MS_TXPWR_MAX_CCH). The illustrated computing system 1050 also includes DSP circuitry 1066, at least one transceiver 1068, and an antenna 1070 for facilitating the communications with the terminal 1000B and/or other devices.

Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium" and/or "computer program product" as used herein are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computer system for controlling the output power level at a terminal. The instructions executable by the computing system and stored on the computer-readable medium perform steps including receiving a channel assignment message at the terminal from the network where the channel assignment message includes a first maximum terminal output power level indicator, defining a terminal output power level to be used as the terminal's output power level based on the first maximum terminal output power level indicator received via the channel assignment message, setting a terminal output power level of the terminal to correspond to the defined terminal output power level, and transmitting data from the terminal at the terminal output power level.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
sending a control message that includes an initial maximum terminal output power level via a control channel to a terminal currently operating in a first frequency band;
generating at least one channel assignment message to facilitate identification of at least one channel for the terminal to communicate information when the terminal transitions between communications in different frequency bands;
associating a maximum terminal output power level value with the at least one channel assignment message; and
transmitting the at least one channel assignment message via a network to the terminal for defining, independently of the initial maximum terminal output power level communicated to the terminal via the control channel, a terminal output power level to be used as the terminal's output power level using the maximum terminal output power level value received via the at least one channel assignment message, wherein the terminal uses the initial maximum terminal output power level as the terminal's output power level if the terminal does not receive the maximum terminal output power level of the channel assignment message via the network.

2. The method of claim 1, wherein the maximum terminal output power level value comprises information to facilitate the definition of the terminal output power level to be used as the terminal's output power level.

3. The method of claim 2, wherein the information comprises an index to a data structure to identify a maximum power level corresponding to the index, and wherein defining the terminal output power level using the maximum terminal output power level value comprises defining the terminal output power level using the maximum power level corresponding to the index to the data structure.

4. The method of claim 1, wherein the maximum terminal output power level value comprises a representation of a maximum power level available for use by the terminal, and wherein defining the terminal output power level using the maximum terminal output power level value comprises defining the terminal output power level using the representation of the maximum power level.

5. The method of claim 1, further comprising communicating the information from the terminal on the at least one channel at the output power level corresponding to the defined terminal output power level.

6. The method of claim 1, wherein the at least one channel assignment message is transmitted for defining the terminal output power level using the maximum terminal output power level value received via the at least one channel assignment message instead of the initial maximum terminal output power level value received via the control channel.

7. The method of claim 6, wherein the initial maximum terminal output power level value comprises a broadcast maximum terminal output power level value.

8. The method of claim 6, wherein the control channel comprises at least one of a Broadcast Control Channel (BCCH), Packet Broadcast Control Channel (PBCCH), or control channel associated with the terminal.

9. The method of claim 1, wherein associating the maximum terminal output power level value with the at least one channel assignment message comprises including a binary representation of the maximum terminal output power level value into a code segment of the at least one channel assignment message.

10. The method of claim 9, wherein including a binary representation of the maximum terminal output power level value into a code segment of the at least one channel assignment message comprises including a binary representation of the maximum terminal output power level value into an information element of the at least one channel assignment message.

11. The method of claim 9, wherein including a binary representation of the maximum terminal output power level value into a code segment of the at least one channel assignment message comprises defining a binary, five-bit TBF_M-S_TXPWR_MAX field representative of an index to a power level table identifying a maximum terminal output power level that can be used by the terminal in the communication of the information.

12. The method of claim 9, further comprising setting a value of PMAX based on the binary representation of the maximum terminal output power level value, and wherein defining a terminal output power level using the maximum terminal output power level value comprises calculating the terminal output power level according to the formula $$P_{CH} = \min(\Gamma_0 - \Gamma_{CH} - \alpha^*(C+48), PMAX).$$

13. The method of claim 12, wherein the binary representation of the maximum terminal output power level value comprises an index to a power level data structure, and wherein setting the value of PMAX based on the binary representation comprises setting the value of PMAX based on a maximum power level identified by the index in the power level data structure.

14. The method of claim 1, wherein generating at least one channel assignment message comprises generating a DTM assignment command at the network in response to receipt of a DTM request message from the terminal, and wherein associating the maximum terminal output power level value with the at least one channel assignment message comprises associating the maximum terminal output power level value with the DTM assignment command.

15. The method of claim 1, wherein generating at least one channel assignment message comprises initiating a DTM assignment command at the network, and wherein associating the maximum terminal output power level value with the at least one channel assignment message comprises associating the maximum terminal output power level value with the DTM assignment command.

16. The method of claim 1, wherein generating at least one channel assignment message comprises generating a packet assignment message at the network in response to receipt of a DTM request message from the terminal, and wherein associating the maximum terminal output power level value with the at least one channel assignment message comprises associating the maximum terminal output power level value with the packet assignment message.

17. The method of claim 1, wherein generating at least one channel assignment message comprises initiating a packet assignment message at the network, and wherein associating the maximum terminal output power level value with the at least one channel assignment message comprises associating the maximum terminal output power level value with the packet assignment message.

18. The method of claim 1, wherein associating the maximum terminal output power level value with the at least one channel assignment message comprises associating the maximum terminal output power level value with the at least one channel assignment message upon Dual Transfer Mode (DTM) establishment following handover.

19. The method of claim 1, wherein generating at least one channel assignment message comprises generating an Immediate Assignment message, and wherein associating the maximum terminal output power level value with the at least one channel assignment message comprises associating the maximum terminal output power level value with an Immediate Assignment Rest Octets information element of the Immediate Assignment message.

20. The method of claim 19, wherein associating the maximum terminal output power level value with an Immediate Assignment Rest Octets information element comprises associating the maximum terminal output power level value with an Enhanced GPRS (EGPRS) Packet Uplink Assignment segment of the Immediate Assignment Rest Octets information element.

21. The method of claim 19, wherein associating the maximum terminal output power level value with an Immediate Assignment Rest Octets information element comprises associating the maximum terminal output power level value with a Packet Uplink Assignment segment of the Immediate Assignment Rest Octets information element.

22. The method of claim 19, wherein associating the maximum terminal output power level value with an Immediate Assignment Rest Octets information element comprises associating the maximum terminal output power level value with a packet downlink assignment segment of the Immediate Assignment Rest Octets information element.

23. The method of claim 1, wherein generating at least one channel assignment message comprises generating a Radio Resource (RR) Packet Uplink Assignment message having an RR Packet Uplink Assignment information element, and wherein associating the maximum terminal output power level value with the at least one channel assignment message comprises associating the maximum terminal output power level value with the RR Packet Uplink Assignment information element.

24. The method of claim 1, wherein generating at least one channel assignment message comprises generating a Radio Resource (RR) Packet Downlink Assignment message having an RR Packet Downlink Assignment information element, and wherein associating the maximum terminal output power level value with the at least one channel assignment message comprises associating the maximum terminal output power level value with the RR Packet Downlink Assignment information element.

25. The method of claim 1, wherein generating at least one channel assignment message comprises generating a Radio Link Control/Medium Access Control (RLC/MAC) message including a Packet Uplink Assignment message, and wherein associating the maximum terminal output power level value with the at least one channel assignment message comprises associating the maximum terminal output power level value with an information element of the Packet Uplink Assignment message.

26. The method of claim 1, wherein generating at least one channel assignment message comprises generating a Radio Link Control/Medium Access Control (RLC/MAC) message including a Packet Downlink Assignment message, and wherein associating the maximum terminal output power level value with the at least one channel assignment message comprises associating the maximum terminal output power level value with an information element of the Packet Downlink Assignment message.

27. The method of claim 1, wherein generating at least one channel assignment message comprises generating a Dual Transfer Mode (DTM) assignment message, and wherein associating the maximum terminal output power level value with the at least one channel assignment message comprises associating the maximum terminal output power level value with the DTM assignment message.

28. A method comprising:
  receiving a control message that includes an initial maximum terminal output power level via a control channel at a terminal operating in a first frequency band;
  receiving a channel assignment message at the terminal informing the terminal to communicate via a second frequency band, wherein the channel assignment message includes a first maximum terminal output power level indicator;
  defining, independently of the initial maximum terminal output power level communicated to the terminal via the control channel, a terminal output power level to be used as the terminal's output power level based on the first maximum terminal output power level indicator received via the channel assignment message;
  setting a terminal output power level of the terminal to correspond to one of: a) the defined terminal output power level if the network provided the first maximum terminal output power level indicator; or b) the initial maximum terminal output power level indicator if the network did not provide the first maximum terminal output power level indicator; and
  transmitting data from the terminal via the second frequency band at the terminal output power level.

29. The method of claim 28, wherein the first maximum terminal output power level indicator comprises a dedicated maximum terminal output power level indicator.

30. The method of claim 28, wherein the initial maximum terminal output power level indicator comprises a broadcast maximum terminal output power level indicator.

31. The method of claim 30, wherein the broadcast maximum terminal output power level indicator comprises one of an MS_TXPWR_MAX_CCH or a GPRS_MS_TXPWR_MAX_CCH value.

32. The method of claim 28, wherein the first maximum terminal output power level indicator comprises a TBF_MS_TXPWR_MAX value.

33. The method of claim 32, wherein TBF_MS_TXPWR_MAX comprises an index to a power level table to identify a PMAX value for use in defining the terminal output power level to be used as the terminal's output power level.

34. The method of claim 32, wherein TBF_MS_TXPWR_MAX comprises a representation of a PMAX value for use in defining the terminal output power level to be used as the terminal's output power level.

35. An apparatus comprising:
a transceiver configured to receive a control message that includes an initial maximum terminal output power level indicator communicated via a control channel to a terminal operating in a first frequency band, and to receive at least one channel assignment message including a maximum terminal output power level value; and
a processor configured to:
define, independently of the initial maximum terminal output power level communicated to the terminal via the control channel, a terminal output power level to be used as the terminal's output power level when the transceiver begins operating in a second frequency band, wherein the terminal output power level is defined based on at least the maximum terminal output power level value provided via the at least one channel assignment message; and
set the terminal output power level to correspond to one of: a) the defined terminal output power level if the network provided the maximum terminal output power level value; or b) the initial maximum terminal output power level indicator if the network did not provide the maximum terminal output power level value.

36. The apparatus as in claim 35, further comprising an output power calculation module operable with the processor, wherein the processor is configured by at least the output power calculation module to define the terminal output power level based on at least the maximum terminal output power level value provided via the at least one channel assignment message.

37. The apparatus as in claim 36, wherein the processor is configured by at least the output power calculation module to calculate the terminal output power level according to the formula $$P_{CH} = \min(\Gamma_0 - \Gamma_{CH} - \alpha*(C+48), PMAX),$$

wherein PMAX is the maximum allowed output power in the cell, and is set based on
a) GPRS_MS_TXPWR_MAX_CCH if a PBCCH exists; or
b) MS_TXPWR_MAX_CCH otherwise; unless
c) TBF_MS_TXPWR_MAX is provided by the network, which corresponds to the maximum terminal output power level value provided via the at least one channel assignment message, wherein PMAX is set based on TBF_MS_TXPWR_MAX.

38. The apparatus as in claim 35, further comprising an output power generator coupled to the processor to receive the defined terminal output power level, and coupled to the transceiver to regulate the output power of a transmitted signal from the transceiver to the network.

39. A computer-readable medium having instructions stored thereon which are executable by a computer system for performing:
receiving a control message that includes an initial maximum terminal output power level indicator via a control channel at a terminal operating in a first frequency band;
receiving a channel assignment message at the terminal informing the terminal to communicate via a second frequency band, wherein the channel assignment message includes a maximum terminal output power level indicator;
defining, independently of the initial maximum terminal output power level communicated to the terminal via the control channel, a terminal output power level to be used as the terminal's output power level based on the maximum terminal output power level indicator received via the channel assignment message;
setting a terminal output power level of the terminal to correspond to the defined terminal output power level if the network provided the first maximum terminal output power level indicator; or b) the initial maximum terminal output power level indicator if the network did not provide the first maximum terminal output power level indicator; and
transmitting data from the terminal via the second frequency band at the terminal output power level.

40. A system comprising:
means for sending a control message that includes an initial maximum terminal output power level value via a control channel to a terminal currently operating in a first frequency band;
means for generating at least one channel assignment message to facilitate identification of at least one channel for the terminal to communicate information when the terminal transitions between communications in different frequency bands;
means for associating a maximum terminal output power level value with the at least one channel assignment message;
means for transmitting the channel assignment message from a network to the terminal; and
means for defining, independently of the initial maximum terminal output power level communicated to the terminal via the control channel, a terminal output power level to be used as the terminal's output power level using the maximum terminal output power level value received via the channel assignment message, wherein the terminal uses the initial maximum terminal output power level as the terminal's output power level if the terminal does not receive the maximum terminal output power level of the channel assignment message via the network.

41. An apparatus comprising:
a processor configured to:
send a control message that includes an initial maximum terminal output power level value via a control channel to a terminal currently operating in a first frequency band;
generate at least one channel assignment message to facilitate identification of at least one channel in a second frequency band in which the terminal currently operating in the first frequency band is to communicate information; and
associate a maximum terminal output power level value with the at least one channel assignment message; and
a transceiver to transmit the channel assignment message to the terminal for defining, independently of the initial maximum terminal output power level communicated to the terminal via the control channel, the terminal's output power level using the maximum terminal output power level value associated with the at least one channel assignment message, wherein the terminal uses the initial maximum terminal output power level as the terminal's output power level if the terminal does not receive the maximum terminal output power level of the channel assignment message.

42. The apparatus as in claim 41, wherein the initial maximum terminal output power level value comprises a broadcast maximum terminal output power level value, and wherein the terminal defines the terminal's output power level using the maximum terminal output power level value associated with the at least one channel assignment message instead of using the broadcast maximum terminal output power level value.

43. The apparatus as in claim 41, wherein the control channel comprises at least one of a Broadcast Control Channel (BCCH), Packet Broadcast Control Channel (PBCCH), or control channel associated with the terminal.

* * * * *